(12) United States Patent
Ravi et al.

(10) Patent No.: US 8,276,666 B2
(45) Date of Patent: Oct. 2, 2012

(54) SEALANT COMPOSITIONS AND METHODS OF USE

(75) Inventors: Krishna M. Ravi, Kingwood, TX (US); Gunnar Lende, Sola (NO)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

(21) Appl. No.: 11/835,847

(22) Filed: Aug. 8, 2007

(65) Prior Publication Data
US 2009/0038800 A1 Feb. 12, 2009

(51) Int. Cl.
E21B 33/13 (2006.01)
(52) U.S. Cl. .................................... 166/292; 166/285
(58) Field of Classification Search .................. None
See application file for complete search history.

(56) References Cited

U.S. PATENT DOCUMENTS

| | | | |
|---|---|---|---|
| 3,448,800 A * | 6/1969 | Wahl et al. ............... | 166/294 |
| 4,083,407 A | 4/1978 | Griffin, Jr. et al. | |
| 5,293,938 A * | 3/1994 | Onan et al. ............... | 166/293 |
| 5,346,550 A * | 9/1994 | Kunzi et al. ............... | 106/709 |
| 5,383,521 A | 1/1995 | Onan et al. | |
| 5,417,285 A | 5/1995 | Van Buskirk et al. | |
| 5,479,986 A | 1/1996 | Gano ...................... | 166/292 |
| 5,577,865 A | 11/1996 | Manrique et al. | |
| 5,588,488 A | 12/1996 | Vijn et al. | |
| 5,667,010 A | 9/1997 | Boyd et al. | |
| 5,688,844 A | 11/1997 | Chatterji et al. | |
| 5,779,787 A | 7/1998 | Brothers et al. | |
| 5,787,983 A | 8/1998 | Heathman et al. ........ | 166/244.1 |
| 5,795,924 A | 8/1998 | Chatterji et al. | |
| 5,820,670 A | 10/1998 | Chatterji et al. | |
| 5,897,699 A | 4/1999 | Chatterji et al. | |
| 5,913,364 A | 6/1999 | Sweatman | |
| 5,921,319 A | 7/1999 | Curtice | |
| 6,060,434 A | 5/2000 | Sweatman et al. | |
| 6,143,069 A | 11/2000 | Brother et al. | |
| 6,167,967 B1 | 1/2001 | Sweatman | |
| 6,210,476 B1 | 4/2001 | Chatterji et al. | |
| 6,234,251 B1 | 5/2001 | Chatterji et al. | |
| 6,244,344 B1 | 6/2001 | Chatterji et al. | |
| 6,315,042 B1 | 11/2001 | Griffith et al. | |
| 6,330,917 B2 | 12/2001 | Chatterji et al. | |
| 6,332,921 B1 | 12/2001 | Brothers et al. | |
| 6,524,384 B2 | 2/2003 | Griffith et al. | |
| 6,593,402 B2 | 7/2003 | Chatterji et al. | |
| 6,668,928 B2 | 12/2003 | Brothers | |
| 6,715,543 B1 | 4/2004 | Svindland .................. | 166/192 |
| 6,732,797 B1 * | 5/2004 | Watters et al. ............. | 166/291 |
| 6,796,378 B2 | 9/2004 | Reddy et al. | |
| 6,832,651 B2 | 12/2004 | Ravi et al. | |
| 6,846,357 B2 | 1/2005 | Reddy et al. | |
| 6,892,814 B2 | 5/2005 | Heathman et al. | |
| 6,902,002 B1 | 6/2005 | Chatterji et al. | |
| 6,962,201 B2 | 11/2005 | Brothers | |
| 7,022,755 B1 | 4/2006 | Chatterji et al. | |
| 7,059,409 B2 | 6/2006 | Fyten et al. | |
| 7,086,466 B2 | 8/2006 | Roddy | |
| 7,172,022 B2 | 2/2007 | Reddy et al. | |
| 7,201,798 B2 | 4/2007 | Brothers et al. | |
| 7,213,646 B2 | 5/2007 | Roddy et al. | |
| 7,229,492 B2 | 6/2007 | Chatterhi et al. | |
| 7,404,855 B2 | 7/2008 | Chatterji et al. | |
| 7,543,642 B2 | 6/2009 | Reddy et al. | |
| 7,607,482 B2 | 10/2009 | Roddy et al. | |
| 7,607,484 B2 | 10/2009 | Roddy et al. | |
| 7,617,870 B1 | 11/2009 | Roddy et al. | |
| 7,631,692 B2 | 12/2009 | Roddy et al. | |
| 7,640,980 B2 * | 1/2010 | Vinegar et al. ............ | 166/268 |
| 7,650,940 B2 | 1/2010 | Reddy et al. | |
| 7,717,176 B2 | 5/2010 | Danican et al. | |
| 7,717,180 B2 | 5/2010 | Badalamenti et al. | |
| 2004/0040714 A1 * | 3/2004 | Funkhouser et al. ....... | 166/295 |
| 2004/0106704 A1 | 6/2004 | Meyer et al. | |
| 2005/0194190 A1 | 9/2005 | Becker et al. | |
| 2006/0048682 A1 | 3/2006 | Wagh et al. | |
| 2006/0122071 A1 | 6/2006 | Reddy et al. | |
| 2007/0051278 A1 | 3/2007 | Wagh et al. | |
| 2007/0151730 A1 | 7/2007 | Reddy et al. | |
| 2008/0028995 A1 | 2/2008 | Barlet-Gouedard et al. | |
| 2008/0060811 A1 | 3/2008 | Bour et al. | |
| 2008/0173777 A1 | 7/2008 | Yamamoto et al. | |
| 2009/0038801 A1 | 2/2009 | Ravi | |
| 2009/0312445 A1 | 12/2009 | Roddy et al. | |
| 2009/0320720 A1 | 12/2009 | Roddy et al. | |
| 2010/0041792 A1 | 2/2010 | Roddy et al. | |
| 2010/0044043 A1 | 2/2010 | Roddy et al. | |

FOREIGN PATENT DOCUMENTS

| | | |
|---|---|---|
| GB | 2202527 A | 9/1998 |
| GB | 2407317 A | 4/2005 |
| WO | WO 2004/101951 A1 | 5/2004 |
| WO | WO 2004/101952 A1 | 5/2004 |
| WO | WO 2005/040549 * | 5/2005 |
| WO | WO 2006/053896 A1 | 5/2006 |
| WO | 2008032049 A1 | 3/2008 |

OTHER PUBLICATIONS

"Consolidated," Schlumberger Oilfield Glossary. retrieved Apr. 8, 2011 from http://www.glossary.oilfield.slb.com/search.cfm.*
Halliburton brochure entitled "Thermatek Service", 2005.
Halliburton brochure entitled "ThermaLock Cement", 2006.
Petroleum Technology Group brochure entitled "Sandaband: Permanent & Temporary Plugging Material", 2006.
International Search Report and Written Opinion for PCT/GB2008/002668, dated Nov. 21, 2008.
Office Action for U.S. Appl. No. 11/835,871, dated Apr. 3, 2009.
Office Action for U.S. Appl. No. 11/835,871 dated Apr. 1, 2010.
Official Action for European Patent No. EP 08 776 139.1 dated May 20, 2010.
Office Action for U.S. Appl. No. 11/835,871 dated Aug. 25, 2010.
"Aggregate Availability in California," copyrighted in 2006 by the Department of Conservation of the California Geological Survey.

* cited by examiner

*Primary Examiner* — Angela M DiTrani
(74) *Attorney, Agent, or Firm* — Craig W. Roddy; McDermott, Will, & Emery LLP

(57) ABSTRACT

Of the many methods and compositions provided herein, one method includes a method comprising introducing a sealant composition into a well bore that penetrates a subterranean formation, wherein the sealant composition comprises a base fluid, a binder material, and a filler material; and allowing the sealant composition to form a cohesive sealant. One composition provided herein includes a sealant composition comprising a base fluid, a binder material, and a filler material, wherein the sealant composition will form a cohesive sealant.

8 Claims, 5 Drawing Sheets

SEALANT COMPOSITIONS AND METHODS OF USE

CROSS-REFERENCE TO A RELATED APPLICATION

This application is related to application Ser. No. 11/835,871 filed on Aug. 8, 2007.

BACKGROUND

The present invention relates to sealant compositions used in subterranean operations, and more particularly, to cohesive sealant compositions and methods of use in subterranean operations.

Hydraulic cement compositions are commonly utilized in subterranean well completion and remedial operations. For example, hydraulic cement compositions are used in primary cementing operations whereby strings of pipe such as casing and liners are cemented in well bores. In performing primary cementing, a hydraulic cement composition is pumped into the annular space between the walls of a well bore and the exterior surface of the pipe string disposed therein. The cement composition is permitted to set in the annular space, thereby forming an annular sheath of hardened cement therein that provides a substantially impermeable hydraulic seal and substantially supports and positions the pipe string in the well bore and bonds the exterior surfaces of the pipe string to the walls of the well bore. As used herein, the term "hydraulic seal" is defined to include the ability to withstand a sufficiently high differential pressure across the sealant in the annulus or well bore as required for the operating envelope of the subject well. Such differential pressures may be caused by injected fluids, formation fluids, and the like. Hydraulic cement compositions also are used in remedial cementing operations such as plugging highly permeable zones or fractures in well bores, plugging cracks in holes in pipe strings, and the like. Hydraulic cement compositions are further used in permanently plugging well bores and isolating certain zones in conjunction with well abandonment. "Zone" as used herein simply refers to a portion of the formation and does not imply a particular geological strata or composition.

Set cement in wells, and particularly the set cement sheath in the annulus of a well, may fail due to, inter alia, shear and compressional stresses exerted on the set cement sheath. This may be particularly problematic in high temperature wells, which are wells wherein fluids injected into the wells, or produced from the wells by way of the well bore, cause a temperature change from initial cement setting conditions. In these types of wells, set cements often fail as a result of the stresses exerted on the set cement. In other types of wells the stresses are induced by movement of faults, or by a general subsidence of the terrain caused by reservoir pressure depletion upon production of hydrocarbons.

The stress exerted on the cement sheath as referred to herein means the force applied over an area resulting from the strain caused by the incremental change in length or volume. The stress is generally thought to be related to strain by a proportionality constant known as Young's Modulus. Young's Modulus is known to characterize the elasticity of a material. In a well bore sealing application, the Young's Modulus for a conventional 16.4 lb/gal cement sheath is about $3 \times 10^6$ lb/in$^2$, and for steel casings, the Young's Modulus is about $30 \times 10^6$ lb/in$^2$.

There are several stressful conditions that have been associated with well bore cement failures. One example of such a condition results from the relatively high fluid pressures and/or temperatures inside of the casing during testing, perforation, fluid injection, or fluid production. If the pressure and/or temperature inside the pipe increases, the resultant internal pressure expands the pipe. This expansion places stress on the cement sheath surrounding the casing causing it to crack, or the bond between the outside surface of the pipe and the cement sheath to fail in the form of, inter alia, loss of hydraulic seal. Another example of such a stressful condition is where the fluids trapped in a cement sheath thermally expand causing high pressures within the sheath/annulus itself. This condition often occurs as a result of high temperature differentials created during production or injection of high temperature fluids through the well bore, e.g., wells subjected to steam recovery processes or the production of hot formation fluids. Other stressful conditions that can lead to cement sheath failures include the forces exerted by shifts in the subterranean formations surrounding the well bore or other over-burdened pressures.

As the well parameters have become more challenging, the stresses imposed on the cement sheath have increased. For example, wells for producing hydrocarbon from a subterranean oil reservoir are often ultimately destroyed as a result of the movement of one or more subterranean rock formations penetrated by the well due to the subsidence of the formations. That is, when a large volume of hydrocarbon is produced from a subterranean reservoir by a well, one or more subterranean rock formations above the reservoir which are also penetrated by the well often subside, which causes movement of the formations transversely to the well bore. This may for example push the tubular to one side of the well bore, and/or move the tubular axially in the well bore, thereby inducing loads on the cement sheath and the tubular which can be detrimental. Hence such movement may eventually cause one or more portions of the rock formations to sever or crush tubular disposed in the well bore, thereby destroying the ability of the well to produce hydrocarbon through the well bore.

Stresses exerted on a cement sheath in the annulus can result in failure of the cement sheath as well as a breakdown of the bonds between the cement sheath and the pipe or between the cement sheath and the surrounding subterranean formations. Such failures can result in at least lost production, enviromnental pollution, hazardous rig operations, and/or hazardous production operations. A common result is the undesirable presence of pressure at the well head in the form of trapped hydrocarbon between casing strings. Additionally, cement sheath failures can be particularly problematic in multi-lateral wells, which include vertical or deviated (including horizontal) principal well bores having one or more ancillary, laterally extending well bores connected thereto.

Previous attempts to delay the well failure due to subsidence have involved drilling an oversized well bore through the rock formations expected to move using under-reaming techniques. Other efforts, as described in U.S. Pat. No. 5,787,983, issued to Heathman et al., involve cutting slots adjacent to the well bore in formations that are expected to move. With these techniques, casing is set uncemented in the well bore thereby leaving an additional annular space or slot around the casing. The existence of this space delays the destruction of the casing by one or more subsiding rock formations for a period of time depending upon the rates of movement of the subsiding formations. However, the space in the annulus does not provide a hydraulic seal for zonal isolation.

Recently, progress has been made to modify the properties of cement sheath used in primary cementing to better withstand the stresses from the well operations. However, some types of load cases, particularly those caused by subsidence, could impose stresses in excess of the maximum load bearing capacity of a conventional or modified cement system. In particular, modified cement slurries do not appear to solve these severe subsidence problems.

SUMMARY

The present invention relates to sealant compositions used in subterranean operations, and more particularly, to cohesive sealant compositions and methods of use in subterranean operations.

In one embodiment, the present invention provides a method comprising introducing a sealant composition into a well bore that penetrates a subterranean formation, wherein the sealant composition comprises a base fluid, a binder material, and a filler material; and allowing the sealant composition to form a cohesive sealant.

In one embodiment, the present invention provides a method comprising introducing a sealant composition into a well bore that penetrates a subterranean formation, wherein the sealant composition comprises an aqueous base fluid, a binder material, and a filler material; and allowing the sealant composition to form a cohesive sealant, wherein: the binder material comprises at least one material selected from the group consisting of fly ash, fume silica, hydrated lime, a pozzolanic material, and a cementitious material; and the filler material comprises at least one material selected from the group consisting of sand, barite, calcium carbonate, ground marble, iron oxide, manganese oxide, glass bead, crushed glass, crushed drill cutting, ground vehicle tire, crushed rock, ground asphalt, crushed concrete, crushed cement, salt, ilmenite, hematite, silica flour, fume (amorphous) silica, fly ash, an elastomer, a polymer, diatomaceous earth, a highly swellable clay miner, nitrogen, air, and a fiber.

In one embodiment, the present invention provides a method comprising introducing a sealant composition into an annulus between a wellbore and a tubular disposed therein, wherein the sealant composition comprises a base fluid, fly ash, hydrated lime, and at least one material selected from the group consisting of sand, barite, calcium carbonate, ground marble, iron oxide, manganese oxide, glass beads, crushed glass, crushed drill cuttings, ground vehicle tire, crushed rock, ground asphalt, crushed concrete, crushed cement, salt, ilmenite, hematite, silica flour, diatomaceous earth, and a highly swellable clay miner; and allowing the sealant composition to form a cohesive sealant.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
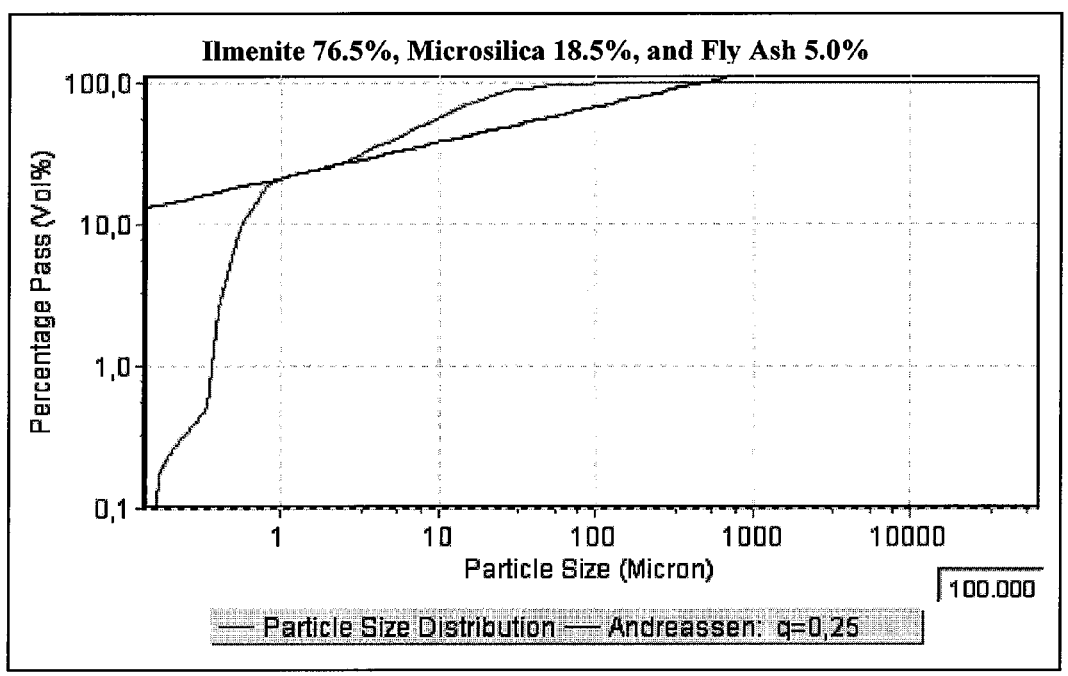
FIG. 1 illustrates the particle size distribution of an example sealant composition of the present invention.

The present invention relates to sealant compositions used in subterranean operations, and more particularly, to cohesive sealant compositions and methods of use in subterranean operations.

Sealant compositions and methods are provided. One of the many advantages of the present invention, many of which are not discussed or alluded to herein, is that the sealant compositions provided herein may be formulated as a pumpable fluid state that will transition to a cohesive state within an operationally acceptable timeline. Another advantage of the present invention is that the compositions provided herein may provide fluid zonal isolation yet be sufficiently elastic and or plastic to prevent or reduce the load transferred to the pipe so that casing displacement in lateral and/or longitudinal directions can occur for as long as the geometry allows. Additionally, sealant compositions of the present invention may be environmentally compliant for an application in a given area. For example, in certain embodiments, a sealant composition of the present invention may comprise only PLONOR or category PLONOR and Yellow (as per the OSPAR definitions current as of the filing of this application) components.

In certain embodiments, the sealant compositions of the present invention may be used as in annular sealing operations, fluid loss control operations (for example as a fluid loss pill associated with well treatments such as drilling and fracturing), and formation consolidation operations. In certain embodiments, the sealant compositions of the present invention may be used in well-plugging operations. In certain embodiments, the sealant compositions of the present invention may be used in lieu of, or in conjunction with, a gravel pack.

Generally, in certain embodiments, the sealant compositions of the present invention are formulated as a fluid (for example, a pumpable sealant slurry) that will undergo a transition (via one or more chemical processes such as curing and/or one or more physical processes) to form a cohesive sealant that may be substantially impermeable, ductile, elastic, and/or non-shrinking. As used herein, the terms "cohesion" and "cohesive" are defined to include a composition having components that are at least in part chemically held together. The terms "cohesion" and "cohesive" as used herein do not contemplate substantially solid (essentially non-plastic) materials (for example conventional cement) that cannot yield when subject to pressure or stress that may be present in a well bore. As used herein, the term "solid" is defined to include materials having a substantially limited ability to yield to applied forces. Thus, cohesive sealant compositions of the present invention are substantially yieldable beyond a certain applied load, but have sufficient cohesion to hold the components together. In certain embodiments, cohesive sealant compositions of the present invention may provide an impermeable hydraulic seal. In certain embodiments, the permeability of the cohesive sealant may be sufficiently low to prevent the migration of fluids or gases through the sealant. In certain embodiments, the cohesive sealant may be sufficiently permeable to allow the migration of fluids through the sealant. A sealant composition of the present invention may comprise a base fluid, a binder material, and a filler material. Optionally, certain embodiments may include additional chemical admixtures having utility in cementing or drilling operations. The formulation can be optimized to give different levels of cohesion suited for the specific application in question.

The sealant compositions of the present invention may comprise a base fluid. The base fluid may be any fluid that is compatible with the subterranean formation, the binder material, and the filler material. The base fluid may be an aqueous fluid, and it may be a non-aqueous fluid. Aqueous base fluids suitable for use in the sealant compositions of the present invention may comprise fresh water, saltwater (for example, water containing one or more salts dissolved therein), brine, seawater, any derivative thereof, and combinations thereof. Generally, the water may be from any source, treated or untreated, provided that it does not contain certain concentrations of components that might adversely affect the properties of the sealant in its slurry and/or cohesive state. In certain embodiments, the base fluid may be present in an amount in the range of from about 200 liters/m$^3$ to about 300 liters/m$^3$.

The sealant compositions of the present invention may comprise one or more binder materials. The binder material may react (or otherwise interact) with the base fluid, the filler material, and/or any other material added so as to at least partially effect a transition of the sealant composition to a cohesive state. The binder material of a sealant composition should not react or interact with components of the sealant composition such that the reaction product is a substantially brittle material rather than a cohesive sealant of the present invention. In certain embodiments, the binder may substantially react with the base fluid. Generally, any binder material that will react with one or more components of the sealant composition to form a cohesive sealant may be used in the sealant compositions of the present invention. The binder material may be chosen so as to form a reaction product that will provide an interaction (chemical or otherwise) among certain components of the sealant that is just strong enough to provide cohesiveness. The binder material may be selected to provide a selected degree of cohesion depending the quantity and type used. In addition, the binder material may be chosen such that the cohesive sealant does not substantially degrade or substantially shrink over time. In certain embodiments the binder may be selected so that the cohesion may be selectively degraded by, for example, pumping another fluid.

Examples of suitable binder materials may include, but are not limited to, one or more of fly ash, fume silica, a pozzolanic material, a cementitious material, any derivative thereof, and combinations thereof. A variety of cementitious materials may be suitable for use in the present invention, including those comprising calcium, aluminum, silicon, oxygen, and/or sulfur, which set and harden by reaction with water. Suitable cementitious materials may include hydraulic cements such as, for example, Portland cements, pozzolanic cements, gypsum cements, soil cements, calcium phosphate cements, high alumina content cements, silica cements, high alkalinity cements, any derivative thereof, and combinations thereof. Other cements that may be suitable for use in accordance with the present invention include, inter alia, low-density cements. Such low-density cements may be, inter alia, foamed cements or cements comprising another means to reduce their density, such as hollow microspheres, low-density elastic beads, fly ashes, blast furnace slag, or other density-reducing additives known in the art. Other examples of binder materials may include resins and/or polymers. Examples of commercially available binder materials that may be useful in certain embodiments of the present invention include, but are not limited to, THERMALOCK™, THERMATEK™, and PlastiCem C$_1$, from Halliburton Energy Services, Inc., Duncan, Okla.

In certain embodiments, the chosen binder material may require the addition of an activator material to cause or allow the binder material to react and/or interact with the base fluid. For example, embodiments wherein water is the base fluid and fly ash is a chosen binder material, the addition of lime may be necessary to activate or facilitate the reaction of the fly ash with the water.

The binder material may be present in the sealant compositions in an amount that is sufficient to effect a transition from a slurry to a cohesive state. In certain embodiments, the binder material may be present in the range of from about 0.25% to about 75% by weight of the slurry ("BWOS"). In certain embodiments, the binder material may be present in the range of from about 0.25% to about 30% BWOS. In certain embodiments, the binder material may be present in the range of from about 0.25% to about 10% BWOS. In certain embodiments, the ability of the binder material to form a cohesive sealant may depend on the amount and type of binder material included in the sealant composition. For example, embodiments utilizing a cementitious material as a binder material may contain cement in an amount of less than about 20% BWOS. In an other example, embodiments utilizing a cementitious material as a binder material may contain cement in an amount of less than about 5% BWOS.

The sealant compositions of the present invention may comprise one or more filler materials. The filler material of a sealant composition should not react or interact with components of the sealant composition such that the reaction product is a substantially brittle material rather than a cohesive sealant of the present invention. Thus, in certain embodiments, a material may act as both a filler and a binder. Suitable filler materials may be insoluble in water and/or formation fluids. Similarly, suitable filler materials may be inert particulates (for example, they should not degrade over time). In certain applications, filler materials that swell either in presence of one or more of water, hydrocarbons, and gases may be used. Suitable filler materials may be chosen from locally (that is, generally local to the jobsite) available materials. It may be desirable to select a source of filler materials that can provide materials of repeatable quality (for example, particle size distribution, density, impurities, and other chemical properties). Examples of suitable filler materials include, but are not limited to, sands, barite, calcium carbonate, ground marble, iron oxide, manganese oxide, glass beads, crushed glass, crushed drill cuttings, ground vehicle tires, crushed rock, ground asphalt, crushed concrete, crushed cement, salt, ilmenite, hematite, silica flour, fume (amorphous) silica, fly ash, elastomers, polymers, diatomaceous earth, highly swellable clay miners such as sodium bentonite (having as a main ingredient montmorillonite), nitrogen, air, fibers, any derivative thereof, and combinations thereof. Examples of suitable polymers include, but are not limited to, natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene propylene rubber, ethylene propylene diene terpolymer rubber, ethylene vinyl acetate copolymer, flourosilicone rubbers, silicone rubbers, poly-2,2,1-bicycloheptene (polynorborneane), alkylstyrene, crosslinked substituted vinyl acrylate copolymer, nitrile rubber (butadiene acrylonitrile copolymer), hydrogenated nitrile rubber, flouro rubbers, perflouro rubbers, tetraflouroethylene/propylene, starch polyacrylate acid graft copolymer, polyvinyl alcoholcyclic acid anhydride graft copolymer, isobutylene maleic anhydride, acrylic acid type polymer, vinylacetate-acrylate copolymer, polyethylene oxide polymers, carboxymethyl cellulose polymers, starch-polyacrylonitrile graft copolymers, polymethacrylate, polyacrylamide, non-soluble acrylic polymers, any derivative thereof, and combinations thereof. Examples of commercially available materials that may be suitable for use as a filler material in the sealant compositions of the present invention include MICROMAX™ Weighting Additive, HI-DENSE® No. 4 Weighting Additive, SSA-1, SSA-2, and HD-5 (each available from Halliburton Energy Services, Duncan, Okla.). In certain embodiments the filler materials may be chosen so that they are selectively degradable (for example, by the addition of an acid or fluid in which the filler material may be soluble, or by another means of removing the filler material after a desired time). Selectively degradable filler materials may be useful, for example, in fluid loss control applications.

In some instances, particle shape and the particle size distribution of the filler material may affect the degree of impermeability of the cohesive sealant. The desired degree of impermeability of the cohesive sealant may depend on the particular application. In annular sealant and well-plugging applications, for example, a low degree of permeability (on the order of about 1 to about $10^{-4}$ miliDarcy ("mD")) may be desirable. In other applications such as, for example, formation consolidation and gravel packing, higher degrees of permeability (on the order of about 1 to about 1000 mD) may be desirable. Generally, the permeability of the cohesive sealant decreases as the particle size distribution of the filler material broadens and as the relative number of fine particles in the particle size distribution increases. Conversely, the permeability of the cohesive sealant generally increases as the particle size distribution of the filler material narrows and as the relative number of coarse particles in the particle size distribution increases. Thus, a general reduction in particle size will cause a decrease in the permeability of the cohesive sealant. A person of ordinary skill in the art, with the benefit of this disclosure, will be able to determine an adequate shape (or shapes) and particle size distribution of the filler material for a given application. The relative number of fine particles and/or coarse particles in the particle size distribution of the filler material in a slurry may be constrained so as to preserve the pumpability of the slurry. Similarly, the filler material may be present in an amount sufficient to impart a desired degree of impermeability to the cohesive sealant, but may not be present in an amount that renders a slurry unpumpable. In certain embodiments, the filler material may be present in an amount from about 5% to about 80% BWOS. In certain embodiments, the filler material may be present in an amount from about 40% to about 70% BWOS.

Figure 5:
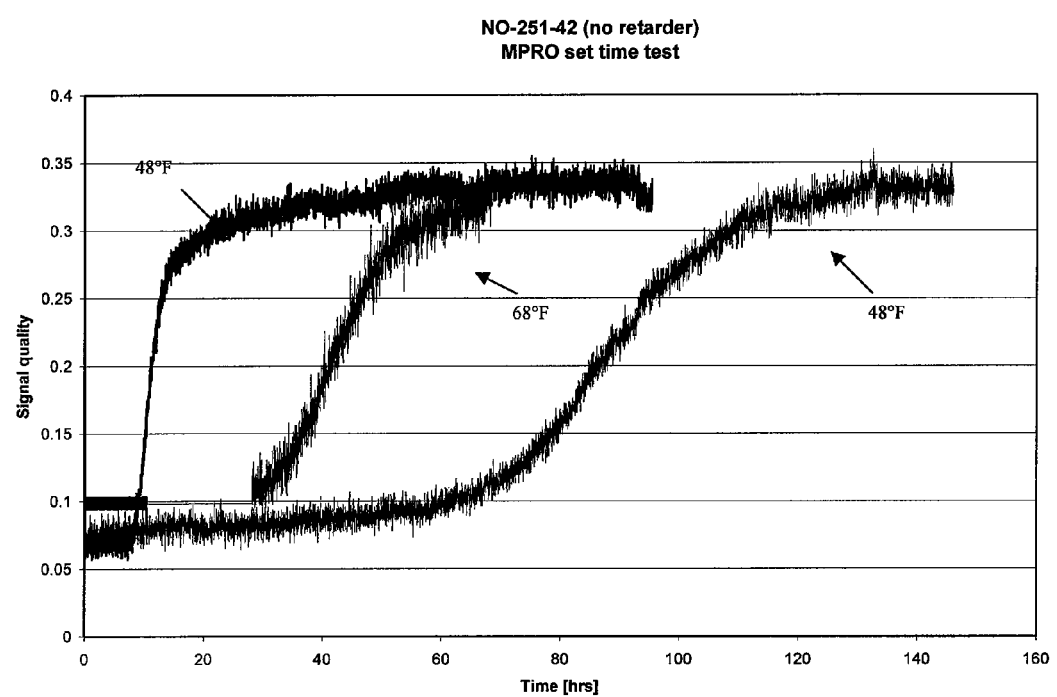
FIG. 5 illustrates the curing time as a function of temperature in the absence of a set retarder.

Optionally, in certain embodiments, the compositions may comprise a set retarder. As used herein, the term "set retarder" refers to an additive that extends the time during which a sealant composition remains in a non-cohesive state after it is mixed. A set retarder may be chosen to allow an operator to select a suitable time frame during and or after placement in a subterranean formation in which a sealant composition of the present invention will undergo a transition to a cohesive sealant at given well conditions. As shown in FIG. 5, the addition of a set retarder may be desirable at higher well bore temperatures. Selection of the type and amount of set retarder(s) largely depends on the exact components of the sealant composition, and it is within the means of those of ordinary skill in the art to select a suitable type and amount of set retarder. Examples of suitable set retarders include, but are not limited to, ammonium, alkali metals, alkaline earth metals, metal salts of sulfoalkylated lignins, ligno sulphonates, hydroxycarboxy acids, copolymers of 2-acrylamido-2-methylpropane sulfonic acid salt and acrylic acid, and maleic acid. One example of a suitable sulfoalkylate lignin comprises a sulfomethylated lignin. Other examples and characteristics of suitable set retarders are disclosed in more detail in U.S. Pat. No. Re. 31,190, the entire disclosure of which is incorporated herein by reference. Example set retarders are commercially available from Halliburton Energy Services, Inc., Duncan, Okla. under the trade names HR® 4, HR® 5, HR® 7, HR® 12, HR® 12L, HR® 15, HR® 25, SCR™ 100, Ensure, HR-817, HR-601, and SCR™ 500.

Generally, where used, the set retarder may be included in the sealant compositions of the present invention in an amount sufficient to provide the desired set retardation. Moreover, it is within the means of those of ordinary skill in the art to exert control over the amount of time that it takes the sealant composition to transition to a cohesive state by determining, through the exercise of routine experimentation, the amount of set retarder necessary to achieve a transition over a desired period of time. In some embodiments, the set retarder may be present in an amount in the range of from about 0.01% to about 20% BWOS. In some embodiments, the set retarding additive may be present in an amount in the range of from about 0.05% to about 10% BWOS.

Additional additives having utility in cementing or drilling operations may be added to the sealant compositions of the present invention as deemed appropriate by one skilled in the art with the benefit of this disclosure. Examples of such additives may include, among others, elastomeric materials, water consuming materials, swelling materials, fume silicas, colloidal silicas, clay inhibitors, fluid loss control additives, surfactants, dispersants, accelerators, salts, mica, fibers, formation-conditioning agents, bentonite, weighting agents, expanding additives, microspheres, defoamers, friction reducers, foaming agents, gas blocking materials, expanding agents, any derivative thereof, and combinations thereof. For example, the sealant compositions of the present invention may be foamed sealant compositions comprising one or more foaming surfactants that may generate foam when contacted with a gas, for example, nitrogen. An example of a suitable friction reducer is CFR-8L™, commercially available from Halliburton Energy Services, Inc., Duncan, Okla. An example of a suitable defoamer is NF-6, commercially available from Halliburton Energy Services, Inc., Duncan, Okla.

The sealant compositions of the present invention and/or any component thereof may be prepared at a job site, or they may be prepared at a plant or facility prior to use, and may be stored for some period of time prior to use. In certain embodiments, the preparation of these sealant compositions of the present invention may be done at the job site in a method characterized as being performed "on the fly." The term "on-the-fly" is used herein to include methods of combining two or more components wherein a flowing stream of one element is continuously introduced into a flowing stream of another component so that the streams are combined and mixed while continuing to flow as a single stream as part of the on-going treatment. Such mixing can also be described as "real-time" mixing. Similarly, different components of the sealant compositions of the present invention may be introduced separately into a subterranean formation.

An embodiment of a method of the present invention comprises: providing a sealant composition comprising a base fluid, a binder material, and a filler material; introducing the sealant composition into a well bore that penetrates a subterranean formation; and allowing the sealant composition to form a cohesive sealant. In certain embodiments the sealant composition may be allowed to form a cohesive sealant in the annulus between the well bore and a tubular present therein. The cohesive sealant may yield when subject to loads applied from the subterranean formation without transferring substantially the load from the subterranean formation to the tubular present in the well bore and without a substantial loss of hydraulic isolation. The cohesive sealant may additionally exhibit a low degree of cohesiveness with a tubular present in the well bore so as to allow the tubular to move radially and/or axially about the well bore, particularly in response to subsidence and other forces that may be present in a subterranean formation. The cohesive state of the sealant composition after it has transitioned to form a cohesive sealant may substantially prevent the filler material particles from undergoing particle segregation over time. As used herein, the term "particle segregation" is defined to include the tendency of particles in a mixture to settle in a downward direction, thereby decreasing permeability in the lower portion of the mixture and increasing permeability in the upper portion of the mixture.

In certain embodiments, the sealant compositions of the present invention may be used to prevent or retard undesired loss or leak off of fluid into the formation. This undesired loss or leak off is commonly referred to as "fluid loss." Fluid loss can occur in drilling operations, cleanup operations, workover operations, completion operations, stimulation treatments (e.g., fracturing, acidizing), and sand control treatments (e.g., gravel packing). A cohesive sealant may be introduced into a well bore that penetrates a subterranean formation so as to reduce fluid loss into at least a portion of the subterranean formation. In certain embodiments, the cohesive sealant may be introduced into a well bore as a pumpable slurry which is allowed to form the cohesive sealant therein. If selectively degradable filler materials are used, an acid or other fluid in which the filler materials are soluble or otherwise degradable may be introduced in to the well bore so as to allow for the removal of the cohesive sealant from the well bore at the completion of the one or more operations during which fluid loss control is desirable.

In certain embodiments, the sealant compositions of the present invention may be prepared off-site, on-site, and/or on-the-fly. In certain embodiments, the sealant compositions may be prepared as a pumpable slurry. Thus, certain embodiments may comprise introducing a pumpable sealant composition into a well bore that penetrates a subterranean formation and allowing the sealant composition to form a cohesive sealant therein. In certain embodiments, the sealant composition may be allowed to form a cohesive sealant prior to the step of introducing the cohesive sealant into the well bore.

In certain embodiments, the filler material may be selected so that the cohesive sealant is substantially impermeable to injected fluids, formation fluids and gases, and/or production fluids. Thus, when located in the annulus between the well bore and a tubular located therein, a substantially impermeable cohesive sealant may advantageously provide a hydraulic seal to create isolation among zones of the subterranean formation. Similarly, when located within a tubular within the well bore, a substantially impermeable cohesive sealant may be useful to plug a well. In certain embodiments, a cohesive sealant plug may be sandwiched between rigid barriers such as cement plugs or mechanical devices such as packers. In certain embodiments, a cohesive sealant plug may be of a length such that one or more rigid barriers may be unnecessary.

In certain embodiments, a hydra jetting tool or similar apparatus may be used to form a slot in a portion of the subterranean formation that may be expected to move as a result of subsidence of the subterranean formation. Suitable methods of forming slots in the subterranean formation are described in U.S. Pat. No. 5,787,983 issued to Heathman et al. ("Heathman"), the entirety of which is incorporated by reference herein. In short, Heathman teaches that a variety of methods and procedures may be used to form slots in a subterranean formation adjacent to a well bore on the opposite side of the well bore from the direction to which the subterranean formation is expected to move. Such slots increase the time during which a subterranean formation may move without transferring load to a tubular in a well bore. By placing a sealant composition of the present invention in a slot adjacent to a well bore, the sealant composition may provide hydraulic isolation among zones of the subterranean formation while yielding about the casing as the formation subsides.

In certain embodiments, the filler material may be selected so that the cohesive sealant has a desired degree of permeability to injected fluids, formation fluids, and/or production fluids. Thus in certain embodiments, the cohesive sealant may be located in the annulus between the well bore and a tubular located therein. The use of a cohesive sealant in this type of operation may serve as a filter bed in lieu of, or in conjunction with, a gravel pack.

In certain embodiments, a cohesive sealant having a desired degree of permeability to injected fluids, formation fluids, and/or production fluids may have utility as a consolidating agent. The term "consolidating agent" as used herein is defined to include an agent that generally is capable of minimizing particulate migration. No particular mechanism of consolidation or stabilization is implied by the term "consolidating agent." Thus in certain embodiments, a sealant composition may be introduced into the subterranean formation and allowed to form a cohesive sealant so as to control the migration of unconsolidated particulates therein. In certain embodiments of this type, the cohesive sealant may provide adhesive bonding between formation particulates to alter the distribution of the particulates within the formation in an effort to reduce their potential negative impact on permeability and/or fracture conductivity. In some embodiments, the cohesive sealant may cause formation particulates to become involved in collective stabilized masses and/or stabilize the formation particulates in place to prevent their migration that might negatively impact permeability and/or fracture conductivity.

To facilitate a better understanding of the present invention, the following examples of certain aspects of some embodiments are given. In no way should the following examples be read to limit, or define, the entire scope of the invention.

EXAMPLES

Example 1

FIG. 1 shows the particle size distribution of an example sealant composition comprising HD-5 filler material, 76.5%, microsilica 18.5%, and fly ash 5.0% solids. A sealant composition comprising this solids fraction may have utility in an annulus between a well bore and a tubular to provide fluid isolation and to prevent load transfer to the tubular.

Example 2

An example sealant composition of the present invention was prepared according to Table 1. The quantities listed in Table 1 are per m³ of sealant composition.

TABLE 1

| | |
|---|---|
| Fresh water | 234.31 liter |
| NF-6 (defoamer) | 1.48 liter |
| Hydrated lime (binder) | 14.84 kg |
| HR-12L (retarder) | 14.84 liter |
| Halad-400L (fluid loss control additive) | 55.64 liter |
| Microsilica liquid F (filler) | 397.76 liter |
| CFR-8L (friction reducer) | 8.9 liter |
| HD-5 (filler material) | 1135 kg |
| PlastiCem C1 (binder) | 74.18 kg |

Figure 2:
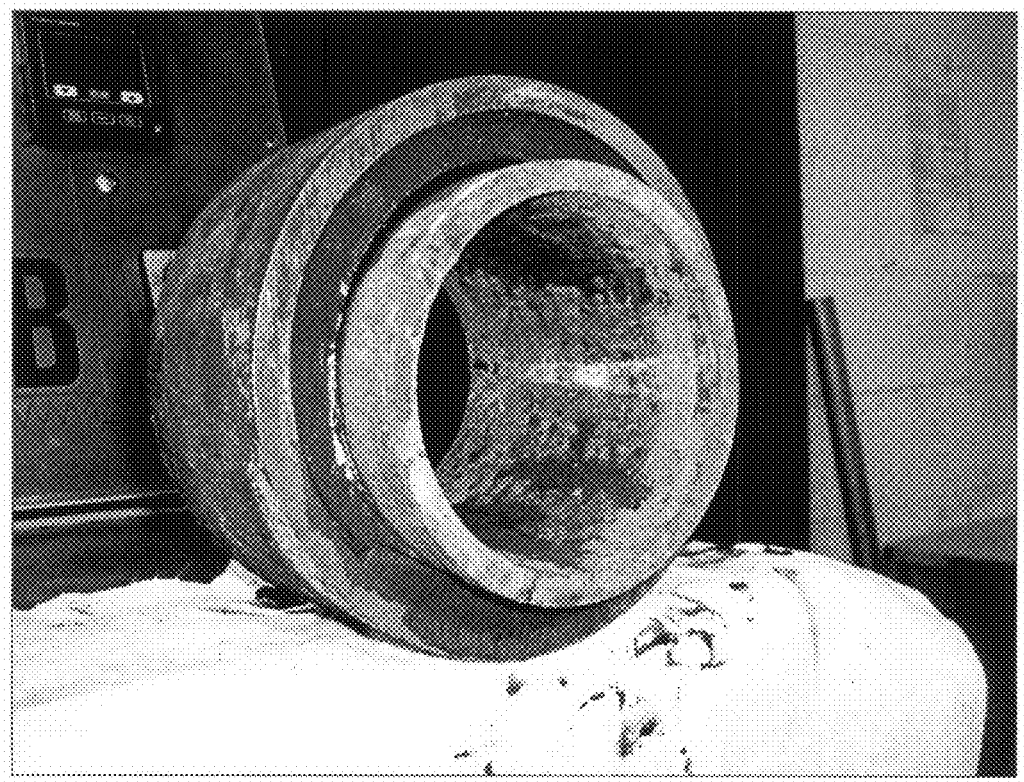
FIG. 2 is a photograph depicting the results of a side load test involving a sealant composition of the present invention.
Figure 3A:
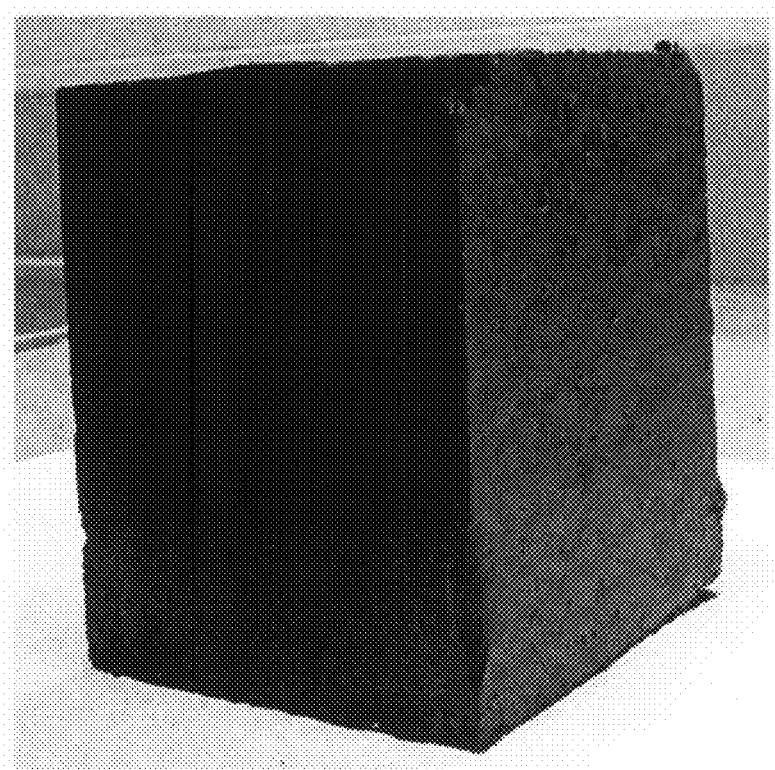
FIGS. 3a and 3b are photographs depicting the reforming of an example cohesive sealant from a cube to a sphere.
Figure 3B:

An example sealant composition formulated according to Table 1 was cured for 7 days to yield an example cohesive sealant. The unconfined compressive yield strength was tested by loading 3 cubes in a Tinnius Olsen test cell. The average compressive yield strength was 59.6 psi. The average permeability of the example cohesive sealant was 0.00087 mD with a standard deviation of 0.0002 mD. No measurable shrinkage of the sample was detected at 100° C. and 7250 psi curing conditions. Shear bond was measured in a shear bond mold to be 3.3 psi. Thus, if the example cohesive sealant was located in 300 feet of an annulus between 5 inch OD tubular and 6.5 inch hole, then the force needed to move the material would be 186,500 pounds-force at the tubular and 242,500 pounds-force at the hole wall. The side load yield force was estimated to be 6-8 psi average (approximately 60 kg on 129 mm×101 mm cylinder, ends unconfined). Although no equipment was available to measure this force formally, FIG. 2 shows the results of the side load yield force test. With unconfined ends, the example cohesive sealant was forced out of the annulus, creating a void on the side opposite from the direction of the applied force. FIG. 3a shows a 4 inch cube of the example cohesive sealant. FIG. 3b shows the cube reformed into a roughly spherical shape.

Example 3

Figure 4:
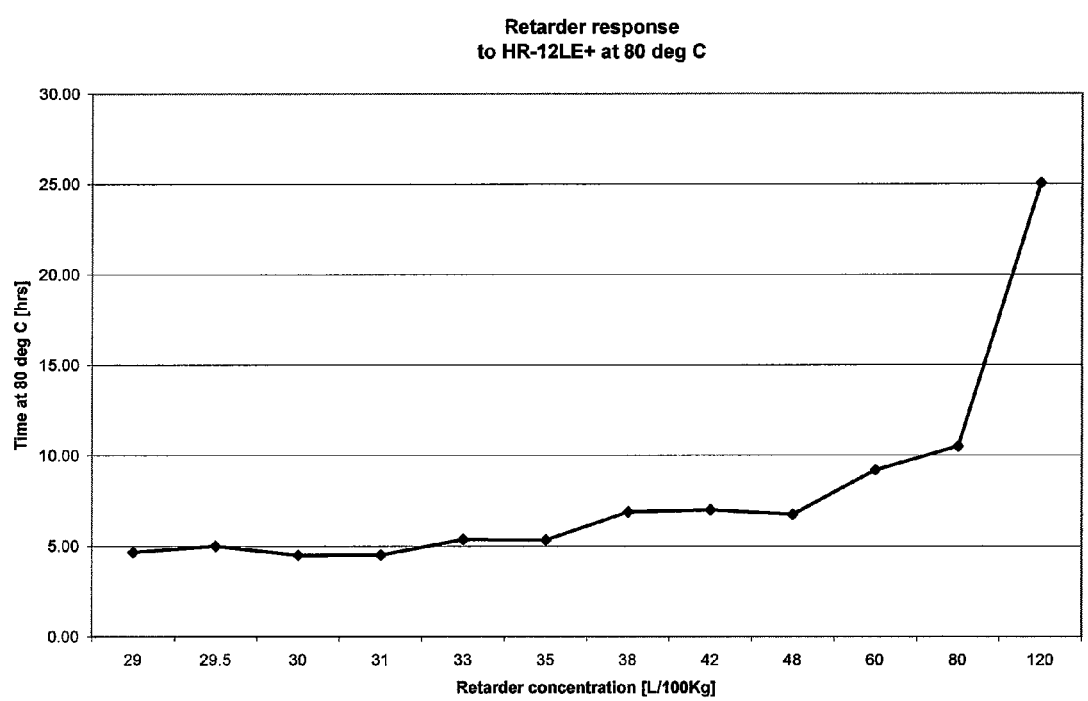
FIG. 4 illustrates the retarder response of an example sealant composition of the present invention.

An example sealant composition was formulated according to Table 1 except that the concentration of HR-12L retarder was varied to evaluate the retarder response of the composition at 80 C. FIG. 4 shows time required for the composition to transition from a pumpable slurry to a cohesive sealant as a function of retarder concentration.

Example 4

An example sealant composition was formulated according to Table 1. FIG. 5 illustrates the time required for the composition to transition to a cohesive sealant at varying temperature.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method comprising:
   introducing a sealant composition as a pumpable slurry into a portion of a subterranean formation, wherein the sealant composition comprises a base fluid, a binder material in an amount from about 0.25% to 9% by weight of the slurry wherein the binder is not a resin or polymer, and a filler material in an amount from about 40% to about 70% by weight of the slurry;
   allowing the sealant composition to form a cohesive sealant that is at least one selected from the group consisting of ductile, elastic, and nonshrinking, that yields to a stress present in the well bore, and has a permeability in the range of from about 1 to about 1000 miliDarcy; and
   allowing the cohesive sealant to consolidate at least partially the portion of the subterranean formation.

2. The method of claim 1, wherein the binder material comprises at least one material selected from the group consisting of fly ash, fume silica, hydrated lime, a pozzolanic material, a cementitious material, and any derivative thereof.

3. The method of claim 1, wherein the filler material comprises at least one material selected from the group consisting of sand, barite, calcium carbonate, ground marble, iron oxide, manganese oxide, glass bead, crushed glass, crushed drill cutting, ground vehicle tire, crushed rock, ground asphalt, crushed concrete, crushed cement, salt, ilmenite, hematite, silica flour, fume silica, fly ash, an elastomer, a polymer, diatomaceous earth, a swellable clay miner, nitrogen, air, a fiber, and any derivative thereof.

4. The method of claim 1, wherein the filler material comprises at least one polymer selected from the group consisting of natural rubber, acrylate butadiene rubber, polyacrylate rubber, isoprene rubber, chloroprene rubber, butyl rubber, brominated butyl rubber, chlorinated butyl rubber, chlorinated polyethylene, neoprene rubber, styrene butadiene copolymer rubber, sulphonated polyethylene, ethylene acrylate rubber, epichlorohydrin ethylene oxide copolymer, ethylene propylene rubber, ethylene propylene diene terpolymer rubber, ethylene vinyl acetate copolymer, flourosilicone rubber, silicone rubber, poly-2,2,1-bicycloheptene (polynorbomeane), alkylstyrene, crosslinked substituted vinyl acrylate copolymer, nitrile rubber (butadiene acrylonitrile copolymer), hydrogenated nitrile rubber, flouro rubber, perflouro rubber, tetraflouroethylene/propylene, starch polyacrylate acid graft copolymer, polyvinyl alcoholcyclic acid anhydride graft copolymer, isobutylene maleic anhydride, acrylic acid type polymer, vinylacetate-acrylate copolymer, polyethylene oxide polymer, carboxymethyl cellulose polymer, starch-polyacrylonitrile graft copolymer, polymethacrylate, polyacrylamide, non-soluble acrylic polymer, and any derivative thereof.

5. The method of claim 1, wherein at least one of the binder material and the filler material is selectively degradable.

6. The method of claim 1, wherein the sealant composition further comprises at least one additive selected from the group consisting of an elastomeric material, a water consuming material, a swelling material, a fume silica, a colloidal silica, a clay inhibitor, a fluid loss control additive, a surfactant, a dispersant, an accelerator, a salt, mica, a fiber, a formation-conditioning agent, bentonite, a weighting agent, an expanding additive, a microsphere, a defoamer, a friction reducer, a foaming agent, a gas blocking material, an expanding agent, any derivative thereof, and any combination thereof.

7. The method of claim 1, wherein the sealant composition is prepared on-site.

8. The method of claim 1, wherein the sealant composition is prepared on-the-fly.

* * * * *